United States Patent
Miao

(10) Patent No.: US 9,087,471 B2
(45) Date of Patent: Jul. 21, 2015

(54) ADAPTIVE BRIGHTNESS CONTROL OF HEAD MOUNTED DISPLAY

(75) Inventor: Xiaoyu Miao, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 859 days.

(21) Appl. No.: 13/289,656

(22) Filed: Nov. 4, 2011

(65) Prior Publication Data

US 2013/0113973 A1 May 9, 2013

(51) Int. Cl.
*G09G 3/00* (2006.01)
*G02B 27/01* (2006.01)

(52) U.S. Cl.
CPC .............. *G09G 3/003* (2013.01); *G02B 27/017* (2013.01); *G02B 2027/014* (2013.01); *G02B 2027/0118* (2013.01); *G02B 2027/0178* (2013.01); *G09G 2320/0626* (2013.01); *G09G 2320/0693* (2013.01); *G09G 2354/00* (2013.01); *G09G 2360/144* (2013.01)

(58) Field of Classification Search
CPC ..................... G02B 27/017; G02B 2027/0118; G02B 2027/0178; G02C 7/101; H04N 13/044; H04N 5/23293
USPC .......... 348/333.01; 345/7–9; 359/13, 14, 322, 359/323, 630–633
See application file for complete search history.

(56) References Cited

U.S. PATENT DOCUMENTS

| 4,711,512 | A | | 12/1987 | Upatnieks |
| 5,076,664 | A | | 12/1991 | Migozzi |
| 5,093,567 | A | | 3/1992 | Staveley |
| 5,485,172 | A | * | 1/1996 | Sawachika et al. ............... 345/8 |
| 5,539,422 | A | | 7/1996 | Heacock et al. |
| 5,696,521 | A | | 12/1997 | Robinson et al. |
| 5,715,337 | A | | 2/1998 | Spitzer et al. |
| 5,739,797 | A | * | 4/1998 | Karasawa et al. ................. 345/8 |
| 5,771,124 | A | | 6/1998 | Kintz et al. |
| 5,815,126 | A | | 9/1998 | Fan et al. |
| 5,844,530 | A | | 12/1998 | Tosaki |
| 5,886,822 | A | | 3/1999 | Spitzer |

(Continued)

FOREIGN PATENT DOCUMENTS

| GB | 2272980 A | 6/1994 |
| JP | 10-148807 A | 6/1998 |

(Continued)

OTHER PUBLICATIONS

PCT/US2012/057016; PCT International Preliminary Report on Patentability, mailed May 15, 2014, 7 pages.

(Continued)

*Primary Examiner* — Paul Berardesca
(74) *Attorney, Agent, or Firm* — Blakely Sokoloff Taylor & Zafman LLP

(57) ABSTRACT

A technique for adaptive brightness control of an eyepiece of a head mounted display ("HMD") includes displaying a computer generated image ("CGI") to an eye of a user from a viewing region of the eyepiece of the HMD. Image data is captured from an ambient environment surrounding the HMD. A brightness value is calculated for the ambient environment based at least in part upon the image data. A bias power setting is determined based at least in part upon the brightness value. The bias power setting is applied to an illumination source for generating the CGI and a brightness level of the CGI displayed to the eye of the user is controlled with the bias power setting.

25 Claims, 7 Drawing Sheets

(56) References Cited

U.S. PATENT DOCUMENTS

| | | | |
|---|---|---|---|
| 5,896,232 | A | 4/1999 | Budd et al. |
| 5,943,171 | A | 8/1999 | Budd et al. |
| 5,949,583 | A | 9/1999 | Rallison et al. |
| 6,023,372 | A | 2/2000 | Spitzer et al. |
| 6,043,591 | A | 3/2000 | Gleckman |
| 6,091,546 | A | 7/2000 | Spitzer |
| 6,172,657 | B1 | 1/2001 | Kamakura et al. |
| 6,201,629 | B1 | 3/2001 | McClelland et al. |
| 6,204,974 | B1 | 3/2001 | Spitzer |
| 6,222,677 | B1 | 4/2001 | Budd et al. |
| 6,335,838 | B1 | 1/2002 | Kasai et al. |
| 6,349,001 | B1 | 2/2002 | Spitzer |
| 6,353,492 | B2 | 3/2002 | McClelland et al. |
| 6,353,503 | B1 | 3/2002 | Spitzer et al. |
| 6,356,392 | B1 | 3/2002 | Spitzer |
| 6,384,982 | B1 | 5/2002 | Spitzer |
| 6,538,799 | B2 | 3/2003 | McClelland et al. |
| 6,618,099 | B1 | 9/2003 | Spitzer |
| 6,690,516 | B2 | 2/2004 | Aritake et al. |
| 6,693,749 | B2 | 2/2004 | King et al. |
| 6,701,038 | B2 | 3/2004 | Rensing et al. |
| 6,724,354 | B1 | 4/2004 | Spitzer |
| 6,738,535 | B2 | 5/2004 | Kanevsky et al. |
| 6,747,611 | B1 | 6/2004 | Budd et al. |
| 6,829,095 | B2 | 12/2004 | Amitai |
| 6,879,443 | B2 | 4/2005 | Spitzer et al. |
| 6,880,931 | B2 | 4/2005 | Moliton et al. |
| 7,126,583 | B1 * | 10/2006 | Breed .......................... 345/158 |
| 7,158,096 | B1 | 1/2007 | Spitzer |
| 7,242,527 | B2 | 7/2007 | Spitzer et al. |
| 7,391,573 | B2 | 6/2008 | Amitai |
| 7,457,040 | B2 | 11/2008 | Amitai |
| 7,576,916 | B2 | 8/2009 | Amitai |
| 7,577,326 | B2 | 8/2009 | Amitai |
| 7,643,214 | B2 | 1/2010 | Amitai |
| 7,663,805 | B2 | 2/2010 | Zaloum et al. |
| 7,672,055 | B2 | 3/2010 | Amitai |
| 7,724,441 | B2 | 5/2010 | Amitai |
| 7,724,442 | B2 | 5/2010 | Amitai |
| 7,724,443 | B2 | 5/2010 | Amitai |
| 7,843,403 | B2 | 11/2010 | Spitzer |
| 7,900,068 | B2 | 3/2011 | Weststrate et al. |
| 8,004,765 | B2 | 8/2011 | Amitai |
| 2003/0090439 | A1 | 5/2003 | Spitzer et al. |
| 2005/0046953 | A1 * | 3/2005 | Repetto et al. ............... 359/630 |
| 2005/0174651 | A1 | 8/2005 | Spitzer et al. |
| 2006/0192306 | A1 | 8/2006 | Giller et al. |
| 2006/0192307 | A1 | 8/2006 | Giller et al. |
| 2008/0219025 | A1 | 9/2008 | Spitzer et al. |
| 2008/0241537 | A1 | 10/2008 | Sennett et al. |
| 2008/0278821 | A1 | 11/2008 | Rieger |
| 2009/0122414 | A1 | 5/2009 | Amitai |
| 2010/0046070 | A1 | 2/2010 | Mukawa |
| 2010/0079356 | A1 | 4/2010 | Hoellwarth |
| 2010/0103078 | A1 | 4/2010 | Mukawa et al. |
| 2010/0149073 | A1 | 6/2010 | Chaum et al. |
| 2010/0278480 | A1 | 11/2010 | Vasylyev |
| 2011/0213664 | A1 | 9/2011 | Osterhout et al. |

FOREIGN PATENT DOCUMENTS

| | | | | |
|---|---|---|---|---|
| JP | 10148807 | * | 6/1998 | ............ G02B 27/02 |
| JP | 2004-233908 | A | 8/2004 | |
| JP | 2004233908 | * | 8/2004 | ............ G02B 27/02 |
| JP | 2007-156096 | | 6/2007 | |
| WO | WO 96/05533 | A1 | 2/1996 | |
| WO | WO 99/24860 | A1 | 5/1999 | |
| WO | WO 2009/136393 | A1 | 11/2009 | |

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

Ruth, Dr. Christine et al., "Ambient Light Sensors SFH 3410, SFH 3710 Application Note", Aug. 18, 2006, 9 pages, Osram Opto Semiconductors GmbH, Regensburg, Germany.

Ruth, Dr. Christine et al., "High Accuracy Ambient Light Sensor SFH 5711 Application Note", Aug. 18, 2006, 9 pages, Osram Opto Semiconductors GmbH, Regensburg, Germany.

Ruth, Dr. Christine et al., "Ambient Light Sensors General Application Note", Jun. 29, 2006, 8 pages, Osram Opto Semiconductors GmbH, Regensburg, Germany.

Osram Opto Semiconductors GmbH, "High Precision Ambient Light Photodiode, Lead (Pb) Free Product—RoHS Compliant SFH 2270R", Dec. 6, 2010, 7 pages, Osram Opto Semiconductors GmbH, Regensburg, Germany.

Osram Opto Semiconductors GmbH, "Silicon Photodiode with Vλ Characteristics, Lead (Pb) Free Produce—RoHS Compliant SFH 2430, SFH 2430 R", Dec. 16, 2008, 7 pages, Osram Opto Semiconductors GmbH, Regensburg, Germany.

Osram Opto Semiconductors GmbH, "Silicon NPN Phototransistor with Vλ Characteristics, Lead (Pb) Free Produce—RoHS Compliant SFH 3310", May 29, 2007, 6 pages, Osram Opto Semiconductors GmbH, Regensburg, Germany.

Osram Opto Semiconductors GmbH, "Silicon NPN Phototransistor with Vλ Characteristics, Lead (Pb) Free Produce—RoHS Compliant SFH 3410", Apr. 2, 2007, 7 pages, Osram Opto Semiconductors GmbH, Regensburg, Germany.

Osram Opto Semiconductors GmbH, "Silicon NPN Phototransistor with Vλ Characteristics, Lead (Pb) Free Produce—RoHS Compliant SFH 3710", Nov. 14, 2007, 6 pages, Osram Opto Semiconductors GmbH, Regensburg, Germany.

Osram Opto Semiconductors GmbH, "High Accuracy Ambient Light Sensor, Lead (Pb) Free Produce—RoHS Compliant SFH 5711", Mar. 21, 2011, 9 pages, Osram Opto Semiconductors GmbH, Regensburg, Germany.

Osram Opto Semiconductors GmbH, "High Accuracy Ambient light sensor with I2C Bus Interference, Lead (Pb) Free Produce—RoHS Compliant SFH 5712", Mar. 31, 2010, 16 pages, Osram Opto Semiconductors GmbH, Regensburg, Germany.

PCT/US2012/057016; PCT International Search Report and Written Opinion of the International Searching Authority, mailed Jan. 29, 2013, 10 pages.

English translation of JP 2007-156096, Machine Translation performed by Google Translate function, Mar. 28, 2013, 17 pages.

* cited by examiner

ADAPTIVE BRIGHTNESS CONTROL OF HEAD MOUNTED DISPLAY

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implement existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system, apparatus, and method of adaptive brightness control for a head mounted display ("HMD") are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
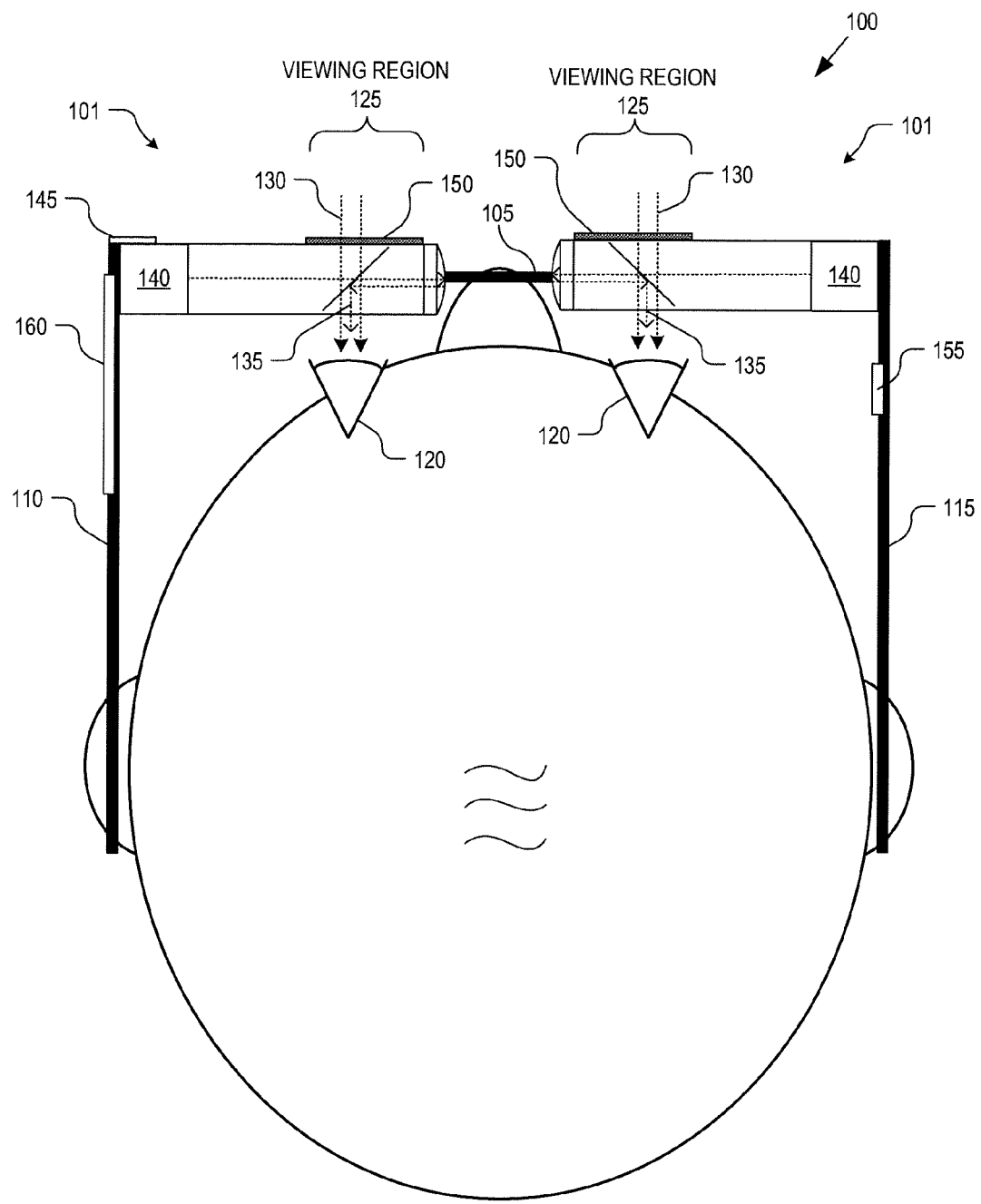
FIG. 1 is a top view of a binocular HMD implemented with eyepieces having adaptive brightness control, in accordance with an embodiment of the disclosure.

FIG. 1 is a top view of a head mounted display ("HMD") 100 using a pair of near-to-eye optical eyepieces 101, in accordance with an embodiment of the disclosure. Eyepieces 101 are mounted to a frame assembly, which includes a nose bridge 105, left ear arm 110, and right ear arm 115. Although FIG. 1 illustrates a binocular embodiment, HMD 100 may also be implemented as a monocular HMD with only a single eyepiece 101 positioned in front of a single eye 120.

The two eyepieces 101 are secured into an eyeglass arrangement that can be worn on the head of a user. The left and right ear arms 110 and 115 extend along the temple region of the user and rest over the user's ears while nose assembly 105 rests over the user's nose. The frame assembly is shaped and sized to position a viewing region 125 of each eyepiece 101 in front of a corresponding eye 120 of the user. Of course, other frame assemblies having other shapes may be used (e.g., a visor with ear arms and a nose bridge support, a single contiguous headset member, a headband, goggles type eyewear, etc.).

The illustrated embodiment of HMD 100 is capable of displaying an augmented reality to the user. Viewing region 125 of each eyepiece permits the user to see a real world image via external ambient scene light 130. Left and right (binocular embodiment) CGI light 135 may be generated by one or two CGI engines (not illustrated) coupled to a respective display source 140 of eyepieces 101. CGI light 135 is seen by the user as a virtual image superimposed over the real world as an augmented reality. In some embodiments, ambient scene light 130 may be blocked, selectively blocked, or partially blocked to improve image contrast and in some cases provide a virtual reality display.

HMD 100 includes an adaptive brightness control feature that may be implemented using one or more of the following components including display source 140, an ambient light sensor 145, a variable transparency layer 150, a controller 155, and a user interface (e.g., graphical user interface (not illustrated) and touch interface 160). In one embodiment, the adaptive brightness control feature adjusts the display brightness of CGI light 135 in real-time based upon the brightness of the ambient environment. In one embodiment, the adaptive brightness control feature includes variable transparency layer 150 disposed over viewing region 125 to control the amount of ambient scene light 130 that is transmitted through eyepieces 101 to eye 120. The transparency of variable transparency layers 150 may also be adjusted in real-time based upon the brightness of the ambient environment to achieve a comfortable brightness level for the user and obtain a desirable level of contrast between ambient scene light 130 and CGI light 135. The adaptive brightness control feature may be capable of adjusting both the brightness of CGI light 135 and the transparency of eyepieces 101 to achieve greater dynamic range and increase user comfort and display options.

Figure 2:
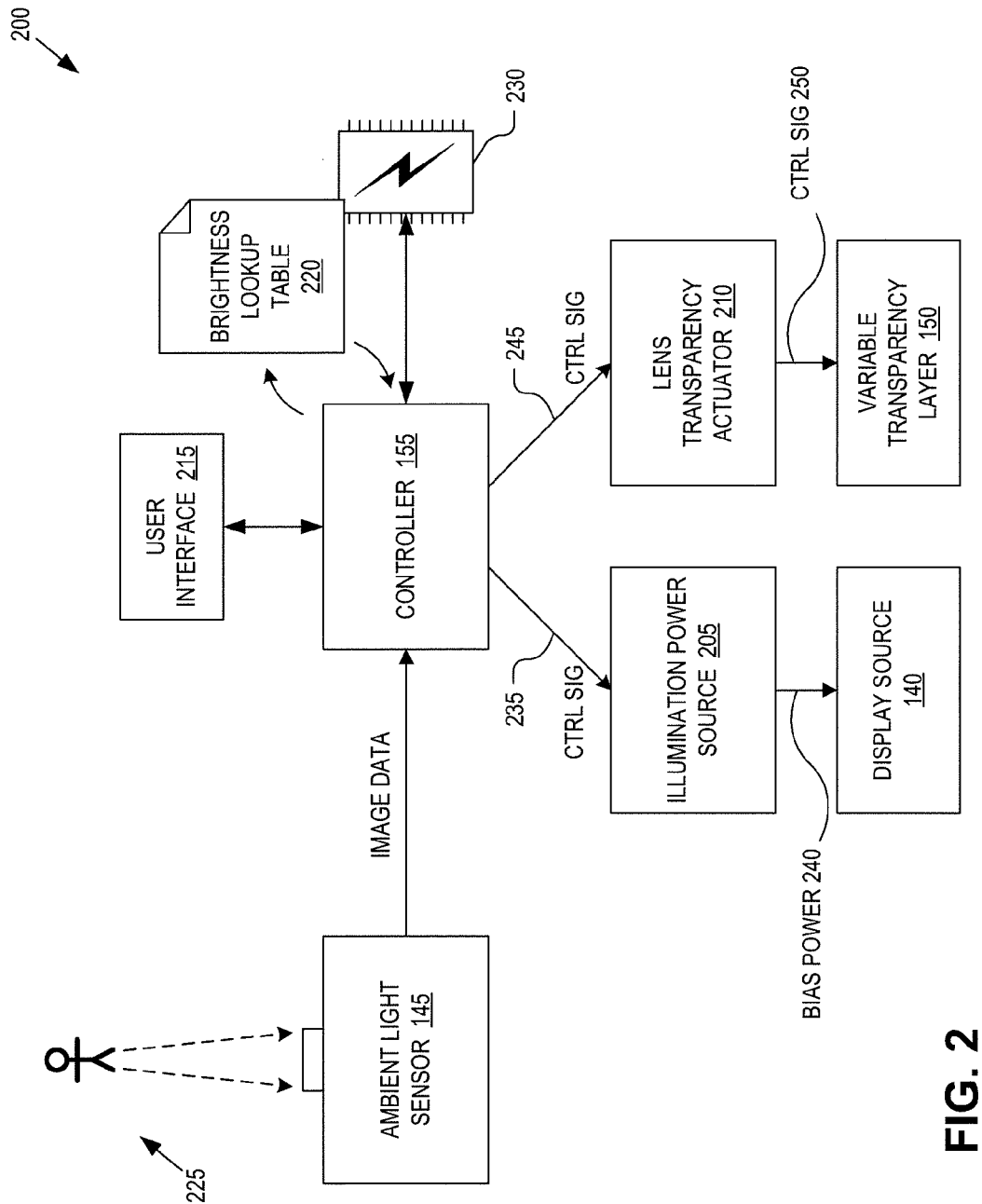
FIG. 2 is a functional block diagram illustrating an adaptive brightness control system for use with a HMD, in accordance with an embodiment of the disclosure.

FIG. 2 is a functional block diagram illustrating an adaptive brightness control system 200 for use with HMD 100, in accordance with an embodiment of the disclosure. The illustrated embodiment of adaptive brightness control system 200 includes ambient light sensor 145, controller 155, illumination power source 205, display source 140, lens transparency actuator 210, variable transparency layer 155, user interface 215, and brightness lookup table 220.

During operation, controller 155 monitors the output of ambient light sensor 145 to determine the brightness of ambient environment 225. Based upon the determined brightness, controller 155 can adjust either the display brightness output from display source 140 and/or the transparency of variable transparency layer 155. In the illustrated embodiment, these adjustments are based at least in part upon a default calibration curve stored within brightness lookup table 220. In one embodiment, user interface 215 may facilitate the user applying selectable offsets from the default settings. User interface 215 may be implemented using a variety of interface mechanisms, such as touch interface 160, a graphical user interface ("GUI") rendered by CGI light 135 to provide visual user feedback, a voice command interface, an audible feedback interface, or otherwise.

Controller 155 is a processor that executes logic to implement the adaptive brightness control functions disclosed herein. Controller 155 may be implemented as an application specific integrated circuit ("ASIC"), a field programmable gate array ("FPGA"), a general purpose processor executing firmware/software instructions, or otherwise. Executable instructions as well as brightness lookup table 220 may be stored in a memory unit 230 coupled to controller 155. Alternatively, the instructions executed by controller 155 maybe hardwired logic. Although FIG. 1 illustrates controller 155 as being disposed within ear arm member 155 of HMD 100, controller 155 may be embedded anywhere within the frame assembly or even mounted to one of eyepieces 101.

Ambient light sensor 145 includes one or more photosensitive elements (e.g., CMOS image sensor, photo-diode, charged coupled device, etc.) for acquiring image data of ambient environment 225. Ambient light sensor 145 may be implemented as a single photo-sensitive element, in which case, the acquired image data is the output of the single photo-sensitive element. In other embodiments, ambient light sensor 145 may include multiple photo-sensitive elements, such as an image sensor pixel array for acquiring low or high resolution still pictures/video pictures of ambient environment 225. In these embodiments, the image data may be a still picture or a continuous video stream.

Ambient light sensor 145 may be disposed anywhere on the frame assembly of HMD 100 or even mounted to a portion of either eyepiece 101. In one embodiment, ambient light sensor 145 is disposed in a forward facing configuration so that it measures the brightness of the forward ambient environment impinging upon eyepieces 101. For example, ambient light sensor 145 may be disposed at one of the front left (illustrated) or right corners of the frame assembly, or even within nose bridge 105. In one embodiment, ambient light sensor 145 may be disposed on the same circuit board (e.g., printed circuit board) as a light flash and/or a separate camera module are disposed to reduce the number of independent components mounted to the frame assembly and share a common flexible ribbon signal cable for coupling signals off the circuit board to controller 155.

Controller 155 is coupled to control display source 140. In one embodiment, controller 155 outputs a control signal 235 to illumination power source 205. Illumination power source 205 is a power controller for controlling bias power 240 applied to display source 140. For example, illumination power source 205 may be a voltage controlled current source for powering a back light or lamp (e.g., LED source) that illuminates a display panel (e.g., LCOS display, LCD panel, etc.) that generates CGI light 135. Alternatively, display source 140 may be a direct emission display (e.g., OLED, quantum dot array, etc.) and illumination power source 205 controls bias power 240 applied directly to the display panel.

In the illustrated embodiment, controller 155 is further coupled to lens transparency actuator 210 via control signal 245, which in turn actuates or controls the transparency of variable transparency layer 155 via control signal 250. Variable transparency layer 155 may be implemented using an electrochromic or switchable mirror layer coated/mounted on the outside (or ambient scene side) of eyepieces 101 in viewing regions 125. For example, variable transparency layer 155 maybe an LCD layer that changes its opacity in response to a control signal 250 (e.g., bias voltage) output by lens transparency actuator 210. In an embodiment wherein control signal 250 is a voltage signal, lens transparency actuator 210 may be implemented as a controllable voltage source. In an embodiment wherein control signal 250 is a bias current signal, lens transparency actuator 210 may be implemented as a controllable current source.

As discussed above, user interface 215 may be implemented using a variety of interface mechanisms that provide a human interface to controller 155, such as touch interface 160, a GUI rendered within CGI light 135 to provide visual user feedback, a voice command interface, an audible feedback interface, or otherwise. In the illustrated embodiment of FIG. 1, user interface 215 includes touch interface 160 disposed along left ear arm 110 at the user's temple region and includes a feedback GUI rendered within CGI light 135. The user can interact with the adaptive brightness control functions using finger taps and swipe motions on the surface of touch interface 160. In this embodiment, touch interface 160 may be a capacitance-sensitive surface. The feedback GUI rendered within the CGI light 134 may serve to acknowledge user inputs received via touch interface 160 and visually indicate to the user the current settings of the adaptive brightness control system, including any user offset(s) applied to the default calibration curve.

Figure 3A:
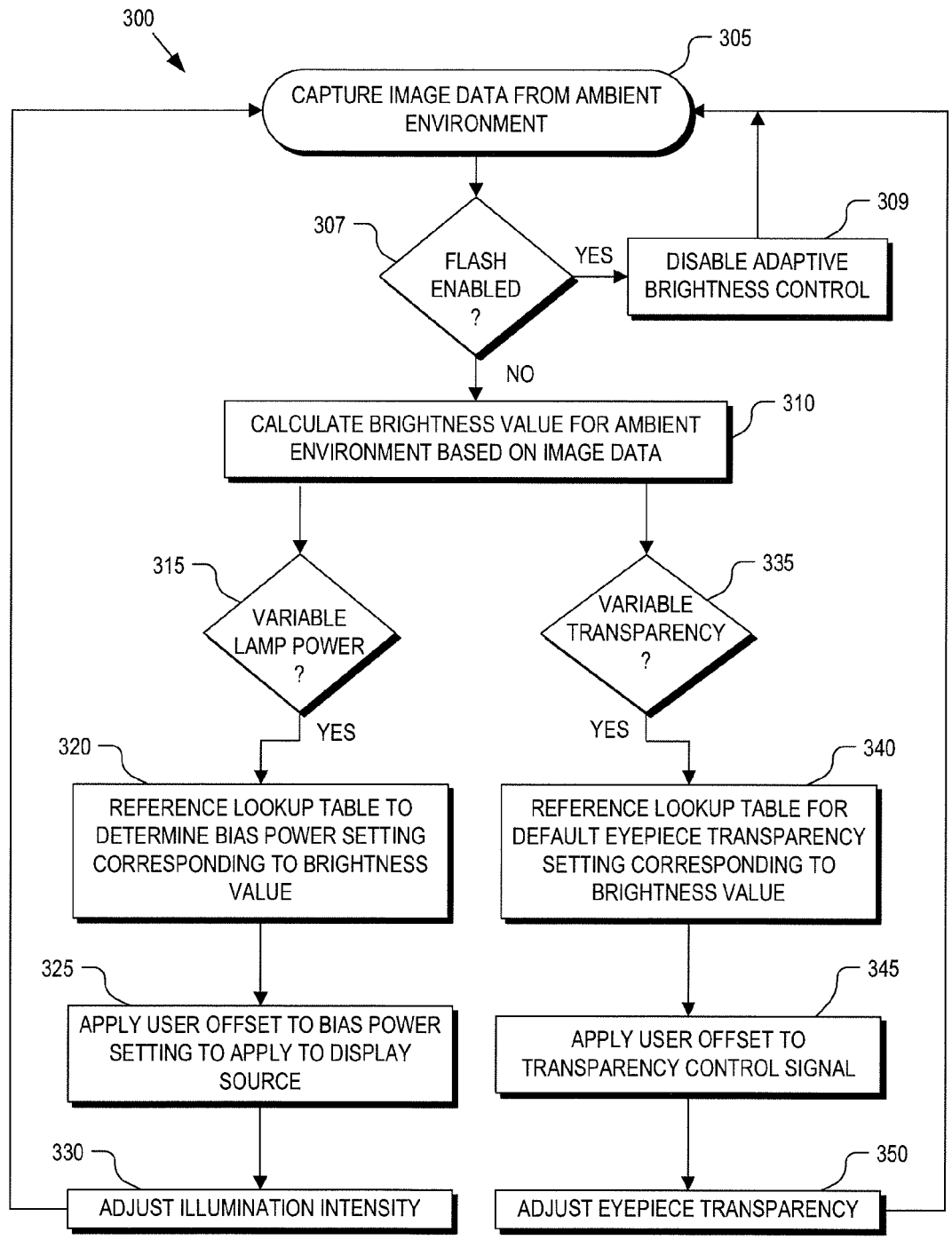
FIG. 3A is a flow chart illustrating a process for adaptive brightness control of a HMD, in accordance with an embodiment of the disclosure.

FIG. 3A is a flow chart illustrating a process 300 for adaptive brightness control of HMD 100, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, ambient light sensor 145 captures image data from ambient environment 225. The image data may be captured by the exposure of a single photosensitive element (e.g., single photo-diode or other brightness sensor) or the exposure of a multi-pixel array image sensor (e.g., still or video image sensor). Ambient light sensor 145 may be an independent light sensitive device used for the sole purpose of sensing the brightness of ambient environment 225, or may also serve additional purposes. For example, in one embodiment, ambient light sensor 145 also captures still images or video images of the forward facing ambient environment 225.

In a decision block 307, if an external flash (e.g., forward facing LED light flash) is enabled for acquiring still or video images in low light environments, the adaptive brightness control feature described herein is disabled (process block 309). In the event that adaptive brightness control is disabled, the previous brightness settings may be maintained, or alternatively, default flash settings for both lamp power and eyepiece transparency may be applied. Disabling adaptive brightness control during operation of an external flash prevents illumination from the external flash itself from interfering with the adaptive brightness settings. In one embodiment, the adaptive brightness control feature may operate when an external flash is enabled, but using appropriate offsets/filter algorithms to account for influences from the external flash optical output.

If the external flash is disabled, then process 300 continues to a process block 310. In a process block 310, the image data is transferred into controller 155 (or memory unit 230 coupled to controller 155) for brightness analysis by controller 155. Controller 155 analyzes the image data to calculate a brightness value based at least in part upon the image data (e.g., the brightness of the image data). In an embodiment where ambient light sensor 145 is a simple brightness sensor, the brightness value may correlate to a simple intensity reading of the image data. In an embodiment where ambient light sensor 145 captures still or video images, the brightness value may correspond to an auto-exposure value or exposure time of ambient light sensor 145 when capturing the image data. In the latter embodiment, controller 155 may include a digital signal processing ("DSP") block for calculating the exposure time.

In an embodiment of HMD 100 that includes variable lamp power for controlling the brightness of the CGI light (decision block 315), process 300 continues to a process block 320. In process block 320, controller 155 uses the determined brightness value to determine a bias power setting for applying to display source 405. In the illustrated embodiment, controller 155 uses the brightness value to index into brightness lookup table 200 to identify the corresponding bias power setting associated with the determined brightness value. Of course, in other embodiments, the bias power setting may be determined by plugging the brightness value into a predetermined brightness versus power equation, as opposed to indexing into a lookup table.

In a process block 325, if the user has input user adjustments to change brightness of the CGI image via user interface 215, then the user offset is applied to the default bias power setting. Finally, in a process block 330, the illumination intensity of the CGI light output from eyepiece 100 is adjusted via appropriate adjustment to the bias power setting applied to display source 140 via illumination power source 205 in response to control signal 235 output from controller 155. The brightness setting of CGI light may be updated in response to a user request, automatically in response to threshold changes in the brightness of ambient environment 225, continuously in real-time, or otherwise.

Returning to process block 310, in an embodiment of HMD 100 that includes variable transparency shading of eyepiece 100 to block variable amounts of ambient light from passing through viewing region 125, (decision block 335), process 300 continues to a process block 340. It should be appreciate that some embodiments of HMD 100 may includes both variable lamp power and variable eyepiece transparency, in which case process blocks 320 through 330 may be executed in parallel or interleaved with the execution of process blocks 340-350.

In process block 340, controller 155 uses the determined brightness value to determine a transparency setting for variable transparency layer 150. In the illustrated embodiment, controller 155 uses the brightness value to index into brightness lookup table 200 (or another independent table) to further identifying the corresponding control setting to apply to variable transparency layer 150 associated with the determined brightness value. Of course, in other embodiments, the transparency control setting may be determining by plugging the brightness value into a predetermined brightness versus transparency equation, as opposed to indexing into a lookup table. In one embodiment, the lookup table stores default calibration settings.

In a process block 345, if the user has input user adjustments to the transparency of viewing region 125 via user interface 215, then the user offset is applied to the default control setting. Finally, in a process block 350, the transparency of variable transparency layer 150 is adjusted via appropriate adjustment to the control setting applied to variable transparency layer 150 via lens transparency actuator 210 in response to control signal 245 output from controller 155. In one embodiment, variable transparency layer 150 may operate like as shutter alternating between two transparency states with the variability achieved by adjusting a frequency or a duty cycle of control signal 250. In another embodiment, variable transparency layer 150 has a static or constant transparency for a given value of control signal 250, but many different values of control signal 250 may be selected. The transparency of eyepiece 100 may be updated in response to a user request, automatically in response to threshold changes in the brightness of ambient environment 225, continuously in real-time, or otherwise.

Figure 3B:
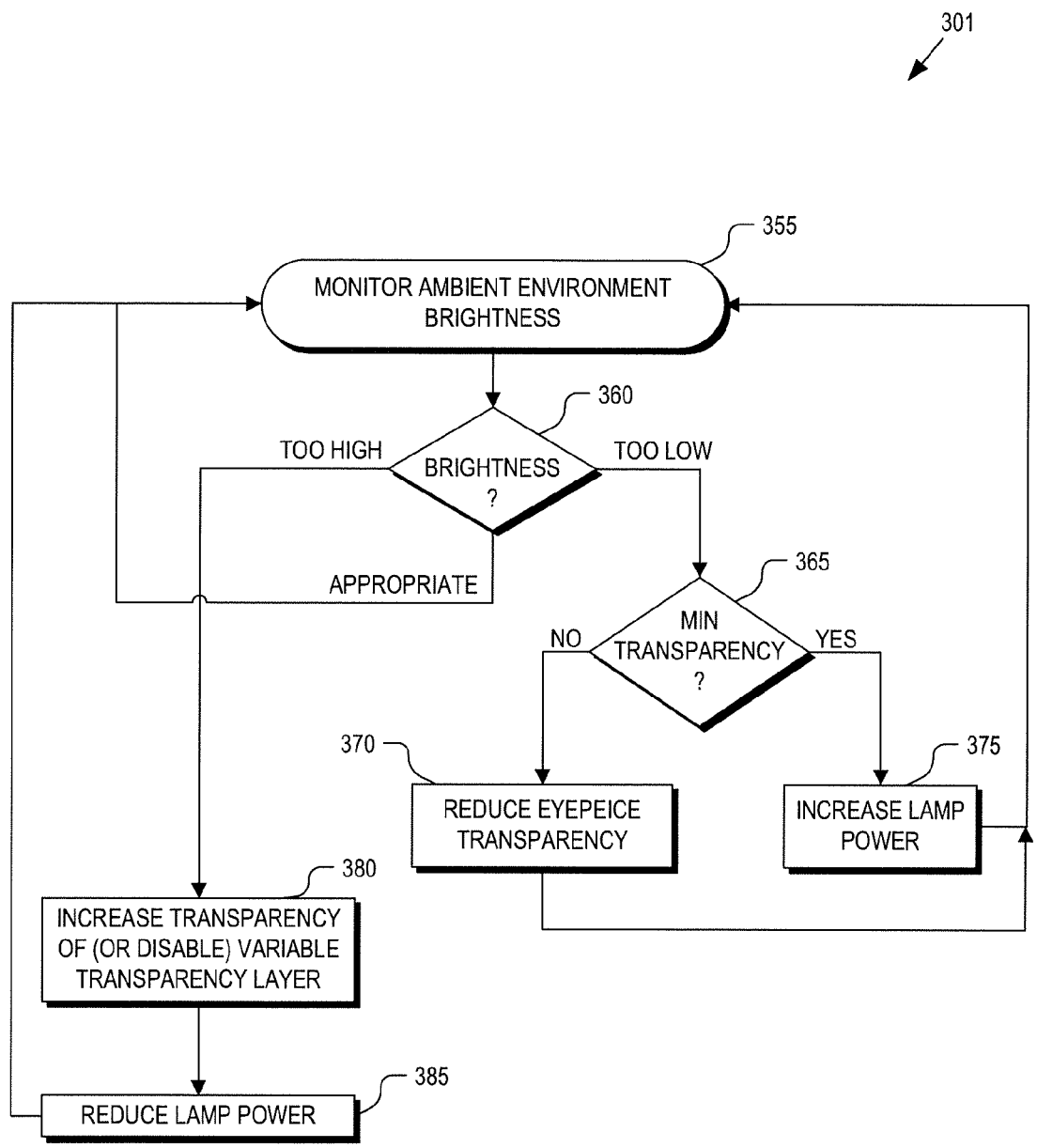
FIG. 3B is a flow chart illustrating a process for determining when to adjust lamp power versus eyepiece transparency, in accordance with an embodiment of the disclosure.

FIG. 3A illustrates how brightness control can be achieved via varying both lamp power and/or eyepiece transparency. However, FIG. 3A merely indicates that these two schemes may operate in parallel or independently of each other, but does not discuss how these two brightness mechanisms may operate together to achieve unified brightness control. FIG. 3B is a flow chart illustrating a process 301 for determining when to adjust lamp power versus eyepiece transparency, in accordance with an embodiment of the disclosure. Process 301 accounts for two scenarios. The first scenario describes the control procedures when the overall display brightness is too low (e.g., walking from an in-door environment to a bright out-door environment). The second scenario describes the control procedures when the overall display brightness is too high (e.g., walking from an out-door environment to a dimmer in-door environment).

In a process block 355, control system 200 continuously monitors the brightness of ambient environment 225 via ambient light sensor 145. If the overall brightness of the emitted CGI light 135 is too low (decision block 360), then process 301 continues to a decision block 365. A determination of the overall brightness may include a determination of whether there is sufficient contrast for user comfort between the intensity of the ambient environment light that passes through an eyepiece 101 versus the intensity of CGI light 135 emitted from eyepiece 101. In decision block 365, controller 155 determines whether the current transparency setting for variable transparency layer 150 is at a minimum transparency for a see-through eyepiece. If not, then the transparency of variable transparency layer 150 may be reduced. In one embodiment, variable transparency layer 150 may have a finite number of transparency settings (e.g., two or more settings). In these embodiments, the transparency of variable transparency layer 150 may be reduced in increments with multiple iterations, or reduced to its minimum setting with a single iteration, to reduce glare from ambient environment 225 and increase the contrast with CGI light 135. Returning to decision block 365, if the transparency of variable transparency layer 150 is already at a minimum (i.e., blocking maximum external ambient light permitted), then the lamp power of display source 140 is increased. Lamp power may be increased in increments until a desired contrast between ambient environment 225 and CGI light 135 is achieved and determined in decision block 360. When operating in the brightness too low scenario, the lamp power is not increased until the transparency of variable transparency layer 150 has reached a threshold minimum level. This technique saves power consumption, since the power consumed to reduce the transparency of variable transparency layer 150 is less compared to increasing the lamp power.

Returning to decision block 360, if the overall display brightness is too high, then process 301 continues to a process block 380. In process block 380, variable transparency layer 150 is either disabled (i.e., set to maximum transparency) or its transparency is increased in finite steps over multiple iterations of process 301. In a process block 385, lamp power of display source 140 is reduced (e.g., reduced in fixed finite steps). Process 301 then reevaluates the brightness of ambient environment 225 (process block 355) and makes a new determination of the overall brightness of eyepieces 101 (decision block 360). If the contrast between CGI light 135 and ambient environment 225 is such that the overall brightness of eyepieces 101 is still either too high or too low, then process 301 re-executes as discussed above. Otherwise, if the brightness is deemed appropriate, control system 200 continues to monitor the bright of ambient environment 355.

Figure 4:
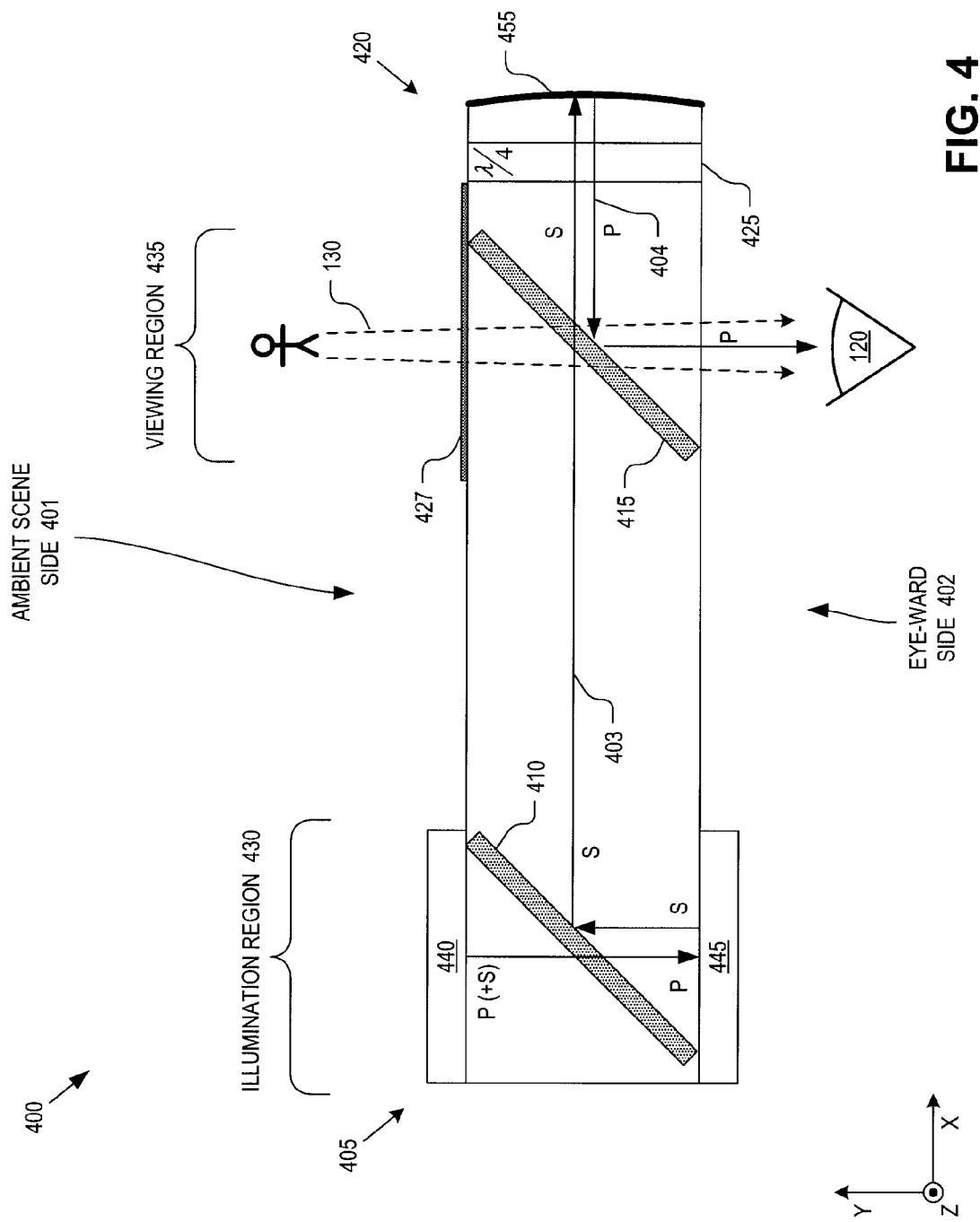
FIG. 4 is a cross-sectional view of an eyepiece, in accordance with an embodiment of the disclosure.
Figure 5:
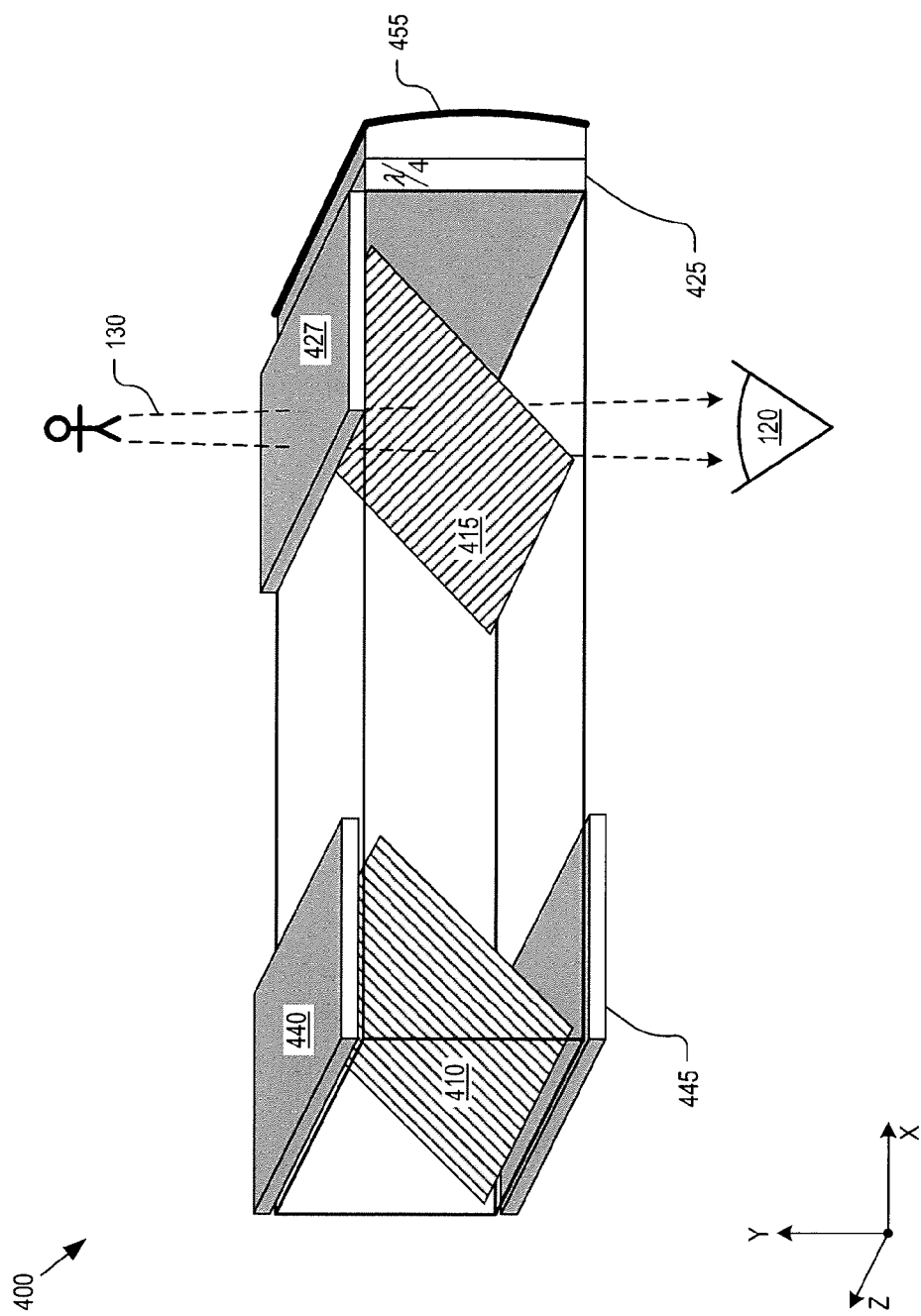
FIG. 5 is a perspective view of an eyepiece, in accordance with an embodiment of the disclosure.

FIGS. 4 and 5 illustrate an eyepiece 400 for use with a HMD, in accordance with an embodiment of the disclosure. FIG. 4 illustrates a cross-sectional view of eyepiece 400 while FIG. 5 illustrates a perspective view of the same. Eyepiece 400 is one possible implementation of eyepieces 101 illustrated in FIG. 1. The illustrated embodiment of eyepiece 400 includes an image source 405, an in-coupling polarizing beam splitter ("PBS") 410, an out-coupling PBS 415, an end reflector 420, a polarization rotator 425, and a variable transparency layer 427. Eyepiece 400 further includes an illumination region 430 and a viewing region 435. The illustrated embodiment of image source 405 includes illumination source 440 and display panel 445. The illustrated embodiment of end reflector 420 includes a convex shaped reflective layer 455.

In one embodiment, the components of eyepiece 400 may be held together via a wire frame that defines an air cavity and holds the internal components in place, or may be fabricated of one or more solid optical materials (e.g., glass, quartz, acrylic, clear plastic, PMMA, ZEONEX-E48R, etc.) to which the external components are disposed on and in which the internal components are embedded. In the illustrated embodiment, in-coupling PBS 410 and out-coupling PBS 415 are mounted within eyepiece 400 at oblique angles (e.g., 45 degrees) to forward propagation path 403. Forward propagation path 403 extends within eyepiece 400 from illumination region 430 to viewing region 435.

Eyepiece 400 is fabricated of transparent material (e.g., glass, quartz, acrylic, clear plastic, PMMA, ZEONEX-E48R, etc.) in viewing region 435 to permit ambient scene light 130 to pass through ambient scene side 401 and eye-ward side 402 of eyepiece 400 to reach eye 120. The semi-transparent nature of viewing region 435 permits eyepiece 400 to provide an augmented reality to the user by augmenting ambient scene light 130 with the CGI light. Variable transparency layer 427 is disposed on ambient scene side 201 in viewing region 235 to automatically dim ambient scene light 130.

Illumination module 440 may be implemented using a light emitting diode ("LED") source (or multi-color LED array), which illuminates display panel 445 through in-coupling PBS 410. Illumination module 440 may output unpolarized light (e.g., both P and S linear polarization components) or output polarized light (e.g., just P polarization component). Illumination module 440 and display panel 445 may be mounted to the outer side of eyepiece 400 in the illumination region 430 in an opposing configuration on either side of eyepiece 400.

In-coupling PBS 410 is positioned within illumination region 430 between illumination module 440 and display panel 445. In-coupling PBS 440 may be implemented as a wire grid polarizer, a multi-layer thin film polarizer, a PBS cube, or otherwise. In-coupling PBS 410 operates to substantially pass light of a first linear polarization while substantially reflecting light of a second polarization. The two linear polarizations are typically orthogonal linear polarizations. Display panel 445 (e.g., LCOS, LCD panel, etc.) imparts image data onto the illumination light output by illumination module 440 to output computer generated image ("CGI") light via selective reflection by an array of image pixels. Reflection by display panel 445 rotates the polarization of the incident lamp light by 90 degrees.

Upon reflection of the incident lamp light, the CGI light (which has been rotated in polarization by 90 degrees) is re-directed by in-coupling PBS 410 and propagates down eyepiece 400 along forward propagation path 403. In one embodiment, the CGI light is directed down eyepiece 400 along forward propagation path 403 without need of total internal reflection ("TIR"). In other words, the cross sectional shape and divergence of the light cone formed by the CGI light is confined such that the light rays reach the end reflector without TIR off the sides of eyepiece 400. In one embodiment, the light cone divergence angle (e.g., 15 degrees) is controlled by a blackout film patterned onto illumination module 440, display panel 445, or elsewhere within eyepiece 400.

Forward propagation path 403 extends to end reflector 420. In one embodiment, the length of eyepiece 400 is selected such that the focal plane of end reflector 420 substantially coincides with an emission aperture of display panel 445. To achieve focal plane alignment with the emission aperture of display panel 445, both the length of eyepiece 400 and the radius of curvature of reflective layer 455 may be selected in connection with each other.

The illustrated embodiment of viewing region 435 includes a reflective surface formed by out-coupling PBS 415. In one embodiment, viewing region 435 is partially transparent, which permits external (ambient) scene light 130 to pass through ambient scene side 401 and eye-ward side 402 of eyepiece 400 to reach eye 120. A partially transparent embodiment facilitates an augmented reality ("AR") where the CGI light is superimposed over external scene light 130 to the user eye 120. By adaptively controlling the transparency (or opacity) of variable transparency layer 427, the overall transparency of viewing region 435 to ambient scene light 130 can be adjusted.

Out-coupling PBS 415 may be configured to pass an orthogonal linear polarization (e.g., S polarization) than in-coupling PBS 210 passes while reflecting the other linear polarization (e.g., P polarization). Alternatively, out-coupling PBS 415 may be identical to in-coupling PBS 415 by inserting a half wave polarization rotator within forward propagation path 403 between the two PBSs. In the illustrated embodiment, polarization rotator 425 is a quarter wave-plate polarization rotator disposed between out-coupling PBS 415 and reflective layer 455. The CGI light is rotated 90 degree in polarization during its double pass through the quarter wave plate via forward propagation path 403 and reverse propagation path 404 after reflection by reflective layer 455. In one embodiment, reflective layer 455, both reflects and collimates the CGI light such that the CGI light traveling along reverse propagation path 404 is substantially collimated. As previously stated, the focal plane of the end reflector may be configured to coincide or nearly coincide with the emission aperture of display panel 445. Collimating the CGI light helps eye 120 to focus on the CGI light emitted out eye-ward side 402 in a near-to-eye configuration (e.g., eyepiece 400 placed within 10 cm of eye 120 and typically less than 5 cm of eye 120). The CGI light is directed towards eye 120 due to the oblique orientation (e.g., approximately 45 degrees relative to sides 401 and 402) of out-coupling PBS 415. In other embodiments, the end reflector reduces the divergence of the CGI light without fully collimating the CGI light. In yet other embodiments, the end reflector may be implemented as a flat reflective surface.

Figure 6:
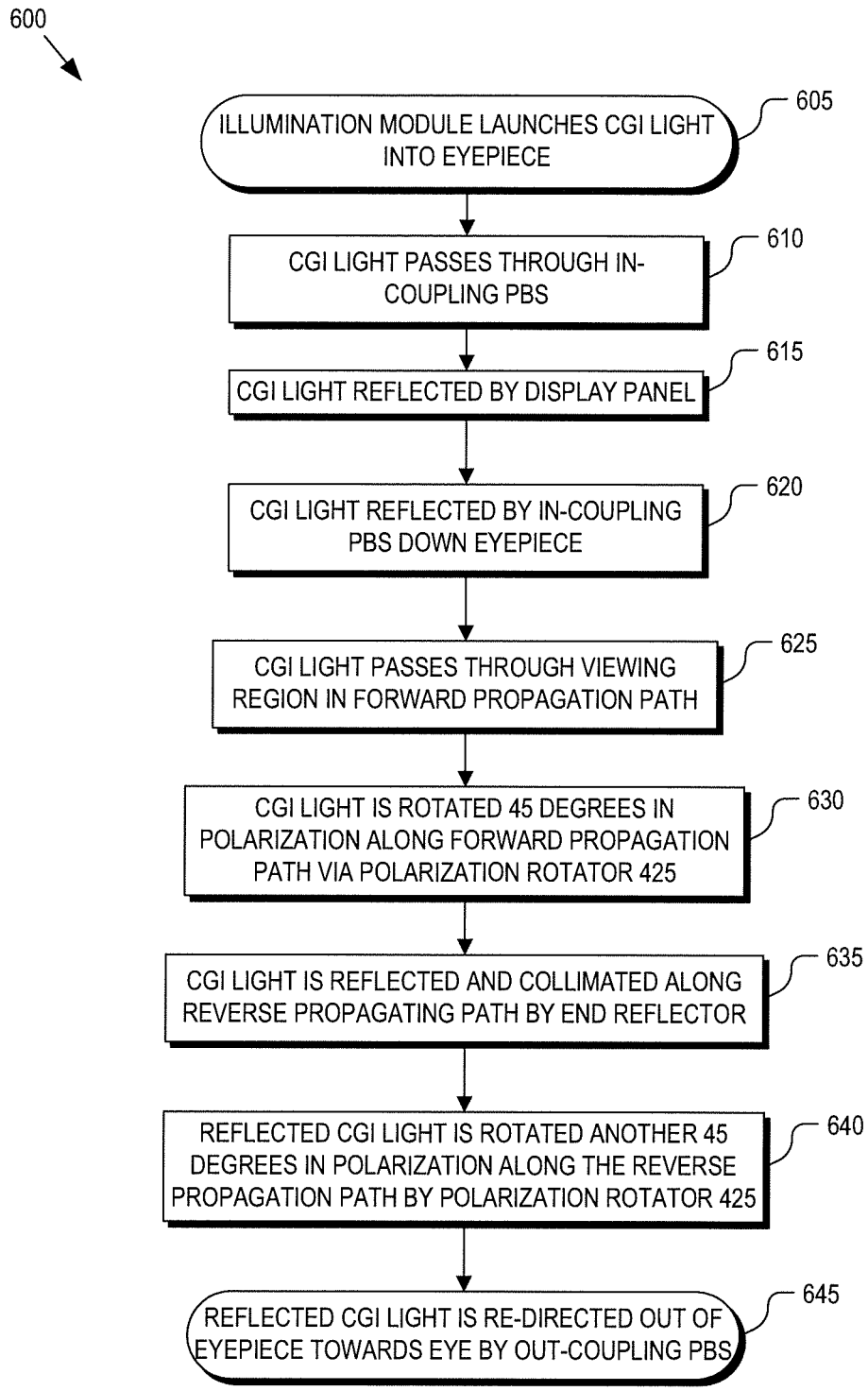
FIG. 6 is a flow chart illustrating a process of operation of an eyepiece to deliver a near-to-eye image to a user, in accordance with an embodiment of the disclosure.

FIG. 6 is a flow chart illustrating a process 600 of operation of eyepiece 400 to deliver a near-to-eye image to a user, in accordance with an embodiment of the disclosure. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

In a process block 605, illumination module 440 emits lamp light being either unpolarized or having a first linear polarization (e.g., illustrated as P polarization) selected to pass through in-coupling PBS 410. Upon passing through in-coupling PBS 410 (process block 610), unpolarized light becomes polarized prior to illuminating display panel 445. Display panel 445 modulates image data onto the incident lamp light by selectively activating image pixels within the display panel. When an image pixel is activated, it reflects its portion of the lamp light (process block 615). In so doing, the reflected CGI light has its polarization rotated by 90 degrees to a polarization that is reflected by in-coupling PBS 410 (e.g., illustrated as S polarization). The CGI light emitted from display panel 445 is reflected back onto in-coupling PBS 445, which re-directs the CGI light along forward propagation path 403 (process block 620). It should be appreciated that the designation of P and S polarizations, whereby P is transmitted and S is reflected is merely demonstrative. Other polarization orientations and transmitted/reflected combinations may be implemented.

The re-directed CGI light propagates down eyepiece 400. In one embodiment, the CGI light passes down eyepiece 400 without TIR and without external surface reflections. In a process block 625, the CGI light passes through viewing region 435 along forward propagation path 403. Out-coupling PBS 415 may be configured to substantially pass the same polarization component as reflected by in-coupling PBS 410, or alternatively a half wave polarization rotator may be disposed in forward propagation 403 between in-coupling PBS 410 and out-coupling PBS 415, as such the CGI light passes through out-coupling PBS 415 substantially without being affected.

In a process block 630, the CGI light then passes through polarization rotator 425 along forward propagation path 403. In so doing, the polarization of the CGI light is rotated by 45 degrees by the quarter wave-plate rotator.

In a process block 635, the CGI light is reflected back along reverse propagation path 404 by reflective layer 455. In one embodiment, reflective layer 455 is concave and has a shape to substantially collimate the CGI light reflected along reverse propagation path 404. Collimating the CGI light has an effect of virtually displacing the CGI image at or near infinity thereby helping the human eye 120 to bring the CGI image into focus. Of course, the end reflector may reduce the divergence without fully collimating the light, thereby displacing the virtual image at a location less than infinity (e.g., 1 to 3 meters).

In a process block 640, the reflected CGI light traveling along reverse propagation path 404 once again passes through polarization rotator 425, causing the polarization of the CGI light to be rotated by another 45 degrees, resulting in the CGI light being linearly polarized at an orthogonal direction of polarization to the forward path. Thus, after passing through polarization rotator 425 for the second time, the CGI light has a polarization that is substantially reflected by out-coupling PBS 415 (e.g., illustrated as P polarization). In a process block 645, the CGI light is reflected by out-coupling PBS 415 and redirected out of eyepiece 400 through eye-ward side 402 towards eye 120.

Some of the processes explained above may be described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for adaptive brightness control of an eyepiece of a head mounted display ("HMD"), the method comprising:
displaying a computer generated image ("CGI") from a see-through viewing region of the eyepiece of the HMD;
capturing image data from an ambient environment surrounding the HMD;
calculating a brightness value for the ambient environment based at least in part upon the image data;
determining a bias power setting to apply to an illumination source for generating the CGI based at least in part upon the brightness value;
controlling a brightness level of the CGI with the bias power setting that is based at least in part upon the brightness value;
adjusting a transparency of a variable transparency layer disposed over the see-through viewing region based at least in part upon the brightness value; and passing ambient scene light through an ambient scene side and an eye-ward side of the eyepiece in the see-through viewing region to an eye of a user, wherein the variable transparency layer is positioned to affect a brightness of the ambient scene light without affecting a brightness of the CGI emitted to the eye, wherein the transparency of the variable transparency layer is reduced prior to increasing the brightness level of the CGI.

2. The method of claim 1, wherein controlling the brightness level of the CGI comprises adjusting the brightness level in real-time in response to changes in the brightness value associated with the ambient environment.

3. The method of claim 1, wherein the variable transparency layer comprises an electro-chromic layer shutter, wherein adjusting the transparency of the variable transparency layer comprises adjusting at least one of a frequency or a duty cycle of a control signal for actuating the electro-chromic layer shutter between two transparency settings.

4. The method of claim 1, wherein capturing the image data from the ambient environment surrounding the HMD comprises:
capturing the image data with an ambient light sensor mounted forward facing on the HMD.

5. The method of claim 1,
wherein capturing the image data from the ambient environment surrounding the HMD comprises capturing a video image of a forward facing scene, and
wherein calculating the brightness value for the ambient environment comprises calculating the brightness value based at least in part upon the video image.

6. The method of claim 5, wherein the brightness value comprises an auto-exposure value for operating a video camera that captures the video image.

7. The method of claim 1, wherein determining the bias power setting to apply to the illumination source comprises:
indexing into a lookup table using the brightness value to obtain the bias power setting, wherein the lookup tables comprises a calibration curve of default brightness values versus default bias power settings.

8. The method of claim 7, further comprising:
providing a user selectable offset feature to apply a user selectable offset from the default bias power setting for a given default brightness value.

9. The method of claim 8, wherein providing the user selectable offset feature comprises:
providing a graphical user interface for displaying a user selectable offset value within the CGI displayed to the user via the HMD; and
providing a touch interface along an ear arm member of the HMD to receive touch commands.

10. A head mounted display ("HMD") for displaying a computer generated image ("CGI"), the HMD comprising:
a display source for generating the CGI;
an eyepiece having a see-through viewing region, the eyepiece coupled to transport the CGI from the display source and emit the CGI out an eye-ward side of the eyepiece in the see-through viewing region, wherein the viewing region is partially transparent to pass ambient scene light through an ambient scene side and the eye-ward side of the eyepiece in the see-through viewing region;
an ambient light sensor to capture image data from an ambient environment surrounding the HMD; and
a controller coupled to the display source, the ambient light sensor, and a machine-accessible storage medium that provides instructions that, when executed by the controller, cause the controller to perform operations comprising:
calculating a brightness value for the ambient environment based at least in part upon the image data;
determining a bias power setting to apply to the display source based at least in part upon the brightness value;
controlling a brightness level of the CGI with the bias power setting that is based at least in part upon the brightness value;
adjusting a transparency of a variable transparency layer disposed over the see-through viewing region based at least in part upon the brightness value; and
reducing the transparency of the variable transparency layer to a minimum transparency prior to increasing the brightness level of the CGI,
wherein the variable transparency layer is positioned to affect a brightness of ambient scene light without affecting a brightness of the CGI emitted to the eye.

11. The head mounted display of claim 10, further comprising:
a frame assembly to support the display source, the eyepiece, the ambient light sensor, and the controller for wearing on a head of a user with the see-through viewing region positioned in front of an eye of the user.

12. The head mounted display of claim 11, wherein the ambient light sensor is mounted to the frame assembly with a forward facing orientation.

13. The head mounted display of claim 12,
wherein the ambient light sensor comprises a video camera and the image data comprises a video image of a forward facing scene,
wherein calculating the brightness value for the ambient environment comprises calculating the brightness value based at least in part upon the video image.

14. The head mounted display of claim 13, wherein the brightness value comprises an auto exposure value for operating the video camera.

15. The head mounted display of claim 12, further comprising:
a forward facing camera to capture forward facing scene images; and
a flash;
wherein the forward facing camera, the flash, and the ambient light sensor are all disposed on a single circuit board that is mounted in or on the frame assembly.

16. The head mounted display of claim 11, wherein determining the bias power setting to apply to the display source comprises:
indexing into a lookup table using the brightness value to obtain the bias power setting, wherein the lookup tables comprises a calibration curve of default brightness values versus default bias power settings.

17. The head mounted display of claim 16, further comprising:
a touch interface disposed along a temple region of the frame assembly,
wherein the machine-accessible storage medium further provides instructions that, when executed by the controller, cause the controller to perform further operations, comprising:
providing a user selectable offset feature to apply a user selectable offset from the default bias power setting for a given default brightness value.

18. The head mounted display of claim 10, wherein the variable transparency layer comprises an electro-chromic layer shutter, wherein adjusting the transparency of the variable transparency layer comprises adjusting at least one of a frequency or a duty cycle of the control signal for actuating the electro-chromic layer shutter between two transparency settings.

19. A non-transitory machine-accessible storage medium that provides instructions that, when executed by a head mounted display, cause the head mounted display to perform operations comprising:
   displaying a computer generated image ("CGI") from a see-through viewing region of an eyepiece of the HMD;
   capturing image data from an ambient environment surrounding the HMD;
   calculating a brightness value for the ambient environment based at least in part upon the image data;
   determining a bias power setting to apply to an illumination source for generating the CGI based at least in part upon the brightness value;
   controlling a brightness level of the CGI with the bias power setting that is based at least in part upon the brightness value; and
   adjusting a transparency of a variable transparency layer disposed over the see-through viewing region based at least in part upon the brightness value,
   wherein ambient scene light passes through an ambient scene side and an eye-ward side of the eyepiece in the see-through viewing region to an eye of a user,
   wherein the variable transparency layer is positioned to affect a brightness of ambient scene light without affecting a brightness of the CGI emitted to the eye,
   wherein the transparency of the variable transparency layer is reduced prior to increasing the brightness level of the CGI.

20. The non-transitory machine-accessible storage medium of claim 19, wherein the variable transparency layer comprises an electro-chromic layer shutter, wherein adjusting the transparency of the variable transparency layer comprises adjusting at least one of a frequency or a duty cycle of a control signal for actuating the electro-chromic layer shutter between two transparency settings.

21. The non-transitory machine-accessible storage medium of claim 19, wherein the variable transparency layer has more than two transparency settings and the transparency is constant for a given value of a control signal.

22. The non-transitory machine-accessible storage medium of claim 19, further providing instructions that, when executed by the head mounted display, cause the head mounted display to perform further operations, comprising:
   providing a user selectable offset feature to apply a user selectable offset to the control signal for adjusting the transparency of the variable transparency layer.

23. The non-transitory machine-accessible storage medium of claim 19,
   wherein capturing the image data from the ambient environment surrounding the HMD comprises capturing a video image of a forward facing scene, and
   wherein calculating the brightness value for the ambient environment comprises calculating the brightness value based at least in part upon the video image.

24. The non-transitory machine-accessible storage medium of claim 19, wherein determining the bias power setting to apply to the illumination source comprises:
   indexing into a lookup table using the brightness value to obtain the bias power setting, wherein the lookup tables comprises a calibration curve of default brightness values versus default bias power settings.

25. The non-transitory machine-accessible storage medium of claim 24, further providing instructions that, when executed by the head mounted display, cause the head mounted display to perform further operations, comprising:
   providing a user selectable offset feature to apply a user selectable offset from the default bias power setting for a given default brightness value.

* * * * *